United States Patent [19]
Beach et al.

[11] Patent Number: 5,492,977
[45] Date of Patent: Feb. 20, 1996

[54] PREPARATION OF AMINO TERMINATED POLYACRYLICS

[75] Inventors: Bradley L. Beach, Lexington; Anna M. Pearson, Richmond; Jing X. Sun, Lexington, all of Ky.

[73] Assignee: Lexmark International, Inc., Greenwich, Conn.

[21] Appl. No.: 360,498

[22] Filed: Dec. 21, 1994

[51] Int. Cl.$^6$ .................................................. C08F 8/12
[52] U.S. Cl. ................. 525/351; 525/330.4; 525/330.6; 525/369; 526/208; 526/211; 526/328
[58] Field of Search ................................. 525/369, 351; 526/208, 211

[56] References Cited

FOREIGN PATENT DOCUMENTS 4139203  5/1992  Japan .

OTHER PUBLICATIONS 1993 article in the Journal *Macromolecules*, vol. 26, No. 9, pp. 2240–2245 by Shefer, Grodzinsky, Prime and Busnel entitled "Free–Radical Telmerization of *tert*–Butyl Acrylate in the Presence of Bis(4– aminophenyl) Disulfide as a Useful Route to Amino–Terminated Telomers of Poly-(acrylic acid)".

*Primary Examiner*—Bernard Lipman
*Attorney, Agent, or Firm*—John A. Brady

[57] ABSTRACT

Amino terminated polyacrylic acids and polyacrylic acrylates are prepared by free radical polymerization of the acid or acrylate monomers with t-Boc-aminoethanethiol as a chain transfer control agent followed by acid removal of the t-Boc group. The acids and their acrylates are precursors to form dispersants and to modify dyes.

4 Claims, No Drawings

PREPARATION OF AMINO TERMINATED POLYACRYLICS

TECHNICAL FIELD

This invention relates to an efficient and low-cost method of preparing amino-terminated polyacrylic acids and its esters useful as precursor moieties for dispersants or for attachment to the dye molecules to modify the properties of the dye and useful in themselves as surfactants.

BACKGROUND OF THE INVENTION

Due to the reaction of amide with acrylate, methods of introducing amino group (such as anionic polymerization) to acrylate without initiating side reactions are few. The method of this invention employs the free radical polymerization technique to synthesis the amino-terminated polyacrylate which give good molecular weight control and low polydispersity. Further hydrolysis of the amino-terminated poly-tert-butyl acrylates under acidic condition offers amino-terminated polyacrylic acids.

A prior, 1993 article in the journal *Macromolecules*, vol. 26, No. 9, pages 2240–2245 by Shefer, Grodzinsky, Prime and Busnel entitled "Free-Radical Telmerization of tert-Butyl Acrylate in the Presence of Bis(4-aminophenyl) Disulfide as a Useful Route to Amino-Terminated Telomers of Poly(acrylic acid)" employs AIBN as the initiator, which is the same initiator employed in the preferred implementation of this invention and employs the same acid, p-toluenesulfonic acid, for subsequent hydrolization. This invention employs a tert-butyl carbonate (t-Boc) protected aminoethanethiol.

There are several reasons for choice of the t-Boc protected aminoethanethiol as chain transfer reagent. First this compound is very easily prepared and obtained in high purity: The t-Boc group converts the solubility of aminoethanethiol from polar aqueous solvents to various organic solvents, such as toluene, therefore, different monomers can be applied in this reaction. The t-Boc group also decreases the hydrogen abstraction from the amine group in free radical polymerization: The t-Boc group is also easily removed under acidic conditions. An azo compound chosen as free radical initiator is 2,2'-azobis(isobutyronitrile) (AIBN), because it is an efficient source of reactive radicals. This method of preparation requires only laboratory capabilities and may be expanded in volume using only larger, but similarly inexpensive equipment.

DISCLOSURE OF THE INVENTION

The polymerization is believed to follow the normal free radical reaction pathway. (Scheme 1)

Scheme 1

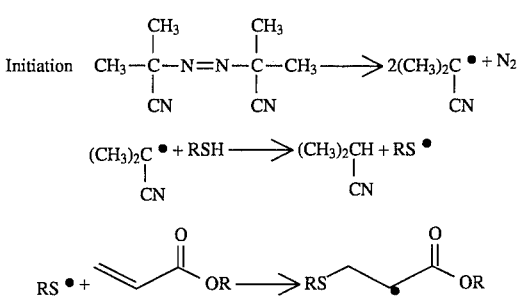

-continued
Scheme 1

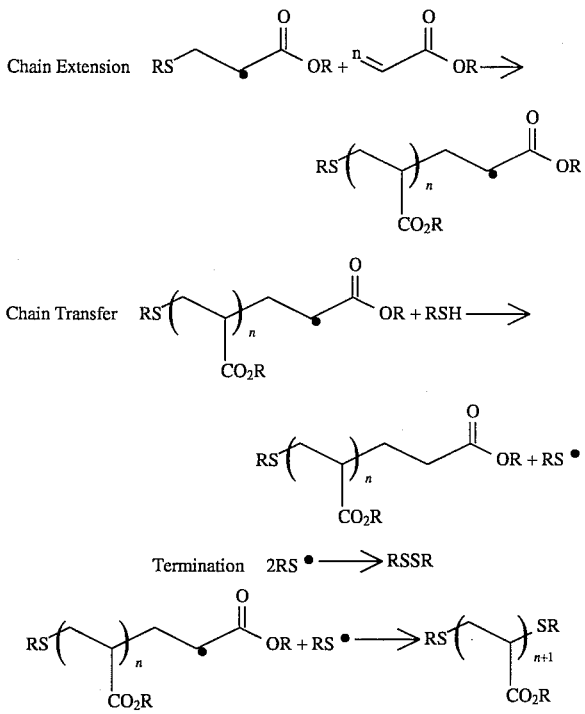

In the initiation step, trace amount of AIBN will generate the sources of free radicals. These initiator radicals then abstract hydrogen from thiol chain transfer control agent to form thiol radicals. The thiol-radicals react with acrylate monomer to initiate polymerization. In the chain extension step, the chain length keeps growing until it abstracts hydrogen from the thiol to terminate the polymerization and generate another thiol radical at the same time which is called chain transfer. The molecular weight of the polymer chain can be controlled by the amount of chain transfer reagent added to the reaction. On the other hand recombination of the radicals may terminate the reaction.

After polymerization, the protective t-Boc group is readily hydrolyzed under acidic conditions. If the tert-butylacrylate is used as monomer, the tert-butyl ester moieties in the polymer chain will be hydrolyzed together with the t-Boc group, so the amino-terminated polyacrylic acid is obtained.

The amino-terminated polyacrylate and its acid can react with other organic compounds such as cyanuric chloride to form a dispersant. By substitution of the chlorides with amino groups both hydrophobic (polyacrylate) and hydrophilic (polyacrylic acid) can be introduced on the same cyanuric ring to form a dispersant. Amino-terminated polyacrylate or acid can also react with the cyanuric chloride containing a dye molecule on the ring to form a dye having the same color but new properties. The amino-terminated polyacrylic acids are moderately effective as surfactants in themselves and useful to disperse mildly cationic materials in water.

BEST MODE FOR CARRYING OUT THE INVENTION

Structural formulas of compounds named in this application are as follows:

Di-tert-butyl dicarbonate: $O[CO_2C(CH_3)_3]_2$
2-Aminoethanethiol hydrochloride: $H_2NCH_2CH_2SH \cdot HCl$
t-Butylcarbonate protected aminoethanethiol: (t-Boc-aminoethanethiol) $HSCH_2CH_2NHCO_2C(CH_3)_3$
t-Butylacrylate: $(tBA)CH_2CHCO_2C(CH_3)_3$
n-Butylacrylate: $(nBA)CH_2CHCO_2CH_2CH_2CH_3$
AIBN: $(CH_3)_2C(CN)-N=N-(CH)C(CH_3)_2$
p-Toluene sulfonic acid: $CH_3-C_6H_4-SO_3H$ Amino-terminated polyacrylate:

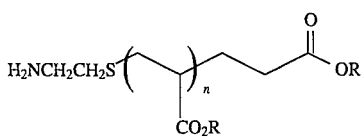

Amino-terminated polyacrylic acid:

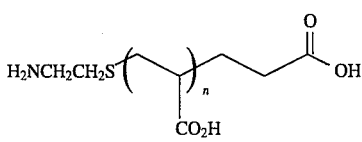

Cyanuric chloride:

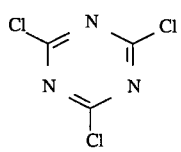

Preparation of t-Butylcarbonateaminoethanethiol

To a nitrogen filled 500 mL 3-neck flask equipped with a thermometer, 18.6 g (0.16 mol) of 2-aminoethanethiol hydrochloride was added to 240 mL of 10% solution of triethylamine in methanol. To this mixture, di-t-butyl dicarbonate 32.4 g (0.147 mol) was added portion with vigorous stirring. The mixture is then heated to 40°–50° C. for 30 min. under nitrogen. After cooling to room temperature, the solvent was evaporated under reduced pressure, and the residue is stirred for 5 minutes in 50 mL ice-cold-dilute hydrochloric acid (pH 2.5), and extracted immediately with ethyl acetate 150 mL. The organic layer, which the product is in, is separated and dried over magnesium sulfate. After filtration, the liquid is collected and the solvent is evaporated under reduced pressure. The residue liquid is distilled under reduced pressure to afford 22.3 g desired product with boiling point 83°–85° C. 2.5 mmHg. Proton and carbon-13 NMR spectra confirmed the structure of the product is t-Boc-$NHCH_2CH_2SH$.

Preparation of Amino-Terminated Polyacrylate

A 200 mL rubber septum sealed flask is flame dried under vacuum, filled with nitrogen and covered with aluminum foil. To this flask, 30 mL of t-butylacrylate or n-butylacrylate, 30 mL of toluene and known quantities of the foregoing t-Boc-aminoethanol chain transfer reagent are added via syringe. About 0.02 wt. % of AIBN was transferred to the flask. After de-gassing and back-filled with nitrogen, the flask is then immersed in all oil bath which was pre-heated to 50° C. This flask is then heated to 70°–75° C. for 3 hours with magnetic stir. The polymerization occurs and the mixture becomes very viscous. After reaction, the flask is immediately immersed in an acetone-dry ice bath for 30 min. and then recovered to room temperature. No further purification is needed.

De-protection of the t-Boc Group and Preparation of Amino-terminated Polyacrylic Acid To the above flask, 70 mL of toluene is added as solvent along with 1.5 g p toluene sulfonic acid (p-TsOH). The mixture is then heated in a water bath for 6 hours, so the t-Boc group connected to the amino group will be removed. If t-butyl acrylate is used as the polymer, the t-butyl group of the ester will be removed at the same time and the amino-terminated polyacrylic acid is precipitated from the solution. If n-butyl acrylate is used, the amino-terminated poly n-butyl acrylate is produced. The precipitate is filtered under vacuum and washed with 1% methanol in hexane. The solid is dried in the vacuum oven at 70° C. for 12 hours to yield amino-terminated polyacrylic acid.

If n-butyl acrylate is used as the polymer, only the t-Boc group is deprotected. When the deprotection is finished, the solution is extracted with ion-exchange resins Amberlite IRP-64 and Amberlite A-21, and then dried over magnesium sulfate. After filtration, the liquid is collected in a flask and the solvent is evaporated under vacuum. The remaining liquid is the amino-terminated poly-n-butyl acrylate.

The molecular weight of the polyacrylate is obtained from GPC (gel permeation chromatography) and listed in Table 1.

TABLE 1

| Polymer Product of | mol of CT* | Mw | Mn | PD** |
|---|---|---|---|---|
| tBA | 7.97 xe-3 | 2194 | 1605 | 1.4 |
| tBA | 5.37 xe-3 | 4313 | 2339 | 1.8 |
| tBA | 3.39 xe-3 | 5736 | 3986 | 1.4 |
| tBA | 2.26 xe-3 | 6648 | 5175 | 1.3 |
| tBA | 1.69 xe-3 | 19170 | 7413 | 2.6 |
| tBA | 1.13 xe-3 | 27567 | 10184 | 2.5 |
| tBA | 0.57 xe-3 | 39887 | 14526 | 2.6 |
| nBA | 5.65 xe-3 | 2717 | 2160 | 1.3 |
| nBA | 1.69 xe-3 | 4091 | 3789 | 1.1 |
| nBA | 1.04 xe-3 | 4247 | 4022 | 1.1 |
| nBA | 7.76 xe-3 | 2979 | 1877 | 1.6 |

*Mol-percent of transfer agent to butyl acrylate.
**Polydispersity.

The yields of the polymerization based on the weight of the product obtained is about 88% in average. The chain transfer constant of t-Boc-aminoethanethiol in t-butyl acrylate is 1.94 and in n-butyl acrylate is 1.19, based on Mayo equation. The functionality of the polymer is about 80–90% in average based on proton NMR.

Usage

The amino-terminated polyacrylic acid and its acrylate react with cyanuric chloride to form a star shaped molecule of the following formula:

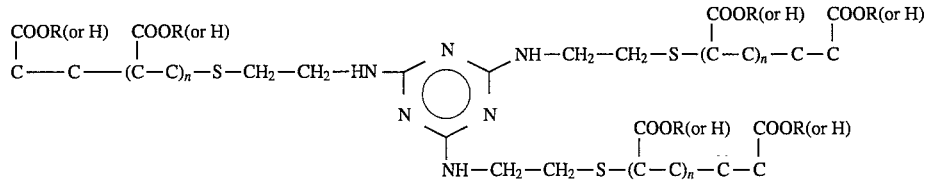

By varying the combination of the polyacrylate and polyacrylic acid on the same cyanuric ring, dispersants containing hydrophobic (polyester) and hydrophilic (polyacid) moieties can be obtained. Further more, the dye group can also be attached to the cyanuric ring containing polyacrylate or acid, to modify its properties in aqueous solution.

Alternatives within the spirit and scope of this invention will be apparent and can be anticipated.

We claim:

1. The method of preparing amino-terminated polyacrylate comprising free radical polymerizing an acrylic acrylate in a nonpolar solvent in the presence of t-Boc-aminoethanethiol as a chain transfer control agent and then removing said t-Boc group by acidifying the product of said polymerizing.

2. The method as in claim 1 in which said acrylic acrylate is n-butyl acrylate.

3. The method of preparing amino-terminated polyacrylic acid comprising free radical polymerizing an acrylic acrylate in a nonpolar solvent in the presence of t-Boc-aminoethanethiol as a chain transfer control agent and then removing said t-Boc group and the ester moiety of said acrylate by acidifying the product of said polymerizing.

4. The method as in claim 3 in which said acrylic acid is t-butyl acrylate.

* * * * *